United States Patent
Franz

(10) Patent No.: US 9,333,449 B2
(45) Date of Patent: May 10, 2016

(54) METHOD FOR PRODUCING A CERAMIC FILTER ELEMENT

(71) Applicant: MANN+HUMMEL GMBH, Ludwigsburg (DE)

(72) Inventor: Andreas Franz, Ludwigsburg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 159 days.

(21) Appl. No.: 14/019,156

(22) Filed: Sep. 5, 2013

(65) Prior Publication Data

US 2014/0167331 A1 Jun. 19, 2014

Related U.S. Application Data

(63) Continuation-in-part of application No. 12/535,041, filed on Aug. 4, 2009, now abandoned.

(30) Foreign Application Priority Data

Aug. 5, 2008 (DE) .................. 10 2008 036 379

(51) Int. Cl.
| | |
|---|---|
| *B01D 46/00* | (2006.01) |
| *C04B 38/00* | (2006.01) |
| *B01D 46/24* | (2006.01) |
| *B01D 39/16* | (2006.01) |
| *B01D 39/18* | (2006.01) |
| *B01D 39/20* | (2006.01) |
| *B01D 46/52* | (2006.01) |
| *F01N 3/022* | (2006.01) |
| *C04B 111/00* | (2006.01) |

(52) U.S. Cl.
CPC ........ *B01D 46/0001* (2013.01); *B01D 39/1623* (2013.01); *B01D 39/18* (2013.01); *B01D 39/2075* (2013.01); *B01D 46/2418* (2013.01); *B01D 46/527* (2013.01); *C04B 38/0083* (2013.01); *B01D 46/2429* (2013.01); *B01D 2046/2433* (2013.01); *B01D 2239/0695* (2013.01); *B01D 2275/30* (2013.01); *C04B 2111/00793* (2013.01); *F01N 3/0222* (2013.01); *F01N 2330/60* (2013.01)

(58) Field of Classification Search
CPC .............. C04B 38/0083; C04B 38/007; C04B 38/0615
See application file for complete search history.

(56) References Cited

U.S. PATENT DOCUMENTS

| | | | |
|---|---|---|---|
| 6,375,014 B1 * | 4/2002 | Garcera et al. | 210/490 |
| 2003/0041574 A1 | 3/2003 | Noguchi | |
| 2007/0186911 A1 * | 8/2007 | Gerlach et al. | 123/556 |
| 2007/0281128 A1 | 12/2007 | He | |

* cited by examiner

*Primary Examiner* — Erin Snelting
(74) *Attorney, Agent, or Firm* — James Hasselbeck

(57) ABSTRACT

In a method for manufacturing a ceramic filter element for an exhaust gas filter of internal combustion engines, a combustible non-ceramic filter medium is shaped to a coil and impregnated with a ceramic slurry having a powder size distribution selected such that the ceramic filter element in the finished state has a desired porosity distribution that varies across the coil cross-section of the ceramic filter element.

11 Claims, 1 Drawing Sheet

METHOD FOR PRODUCING A CERAMIC FILTER ELEMENT

CROSS-REFERENCE TO RELATED APPLICATIONS

This application is a continuation-in-part of application Ser. No. 12/535,041, filed Aug. 4, 2009 which claims the benefit of German Patent Application No. 10 2008 036 379.0 filed Aug. 5, 2008. The entire contents of application Ser. No. 12/535,041 are incorporated by reference and to the fullest extent of the law.

TECHNICAL FIELD

The present invention generally relates to a method for producing a ceramic filter element for an exhaust gas filter of an internal combustion engine. In particular, the invention concerns a diesel particulate filter. Especially, the invention concerns a diesel particulate filter with a gradient structure.

BACKGROUND OF THE INVENTION

WO 2006/005668 (published in the US as US2007/186911, the contents of which are hereby incorporated by reference in their entirety) discloses a method for producing a ceramic filter element for an exhaust gas filter of internal combustion engines. In this connection, first a combustible, non-ceramic support web is impregnated with a ceramic slurry and the web is subsequently burned off in the desired geometric shape to such an extent that the support web is combusted and a rigid filter body remains. Such porous ceramic components can be used, for examples, as catalyst supports or for filtration applications, primarily in a high-temperature range.

For use as a filter element, an alternating closure of the passages is required, wherein the aforementioned method has the advantage that the closure can be provided already during manufacture of the paper elements so that no additional manufacturing step must be performed subsequently, as is the case for extruded honeycomb bodies, for example.

A variety of ceramic adhesives and potting compounds are commercially available, for example, from the companies Cotronics Corp. or Sauereisen. These compounds may be used for closing off the passages and are collectively referred to as potting compounds, ceramic adhesives or ceramic plugging, which provides filter elements that, after sintering, have a uniform pore distribution across their cross-section.

As can be understood, there remains a need in the art for a method for producing a ceramic filter element that avoids the aforementioned disadvantages of the prior art.

SUMMARY OF THE INVENTION

It is therefore an object of the present invention to provide a method for producing a ceramic filter element for an exhaust gas filter of an internal combustion engine that makes it possible to obtain a filter element that has across its cross-section a varying porosity.

In accordance with the present invention, this is achieved in regard to the method for producing a ceramic filter element in that a combustible non-ceramic filter medium is shaped to a coil and is impregnated with a ceramic slurry wherein the ceramic slurry may be provided as individual ceramic slurries of differing ceramic powder sizes, the ceramic slurry applied according to powder size in a selected zoned fashion to the coil cross section, or alternately the unrolled sheet (before rolling), such that the resulting powder size distribution in the filter element in the finished state is a desired porosity distribution that varies by zone across the coil cross-section.

In accordance with the present invention, this is achieved in that a ceramic slurry is provided as slurries of differing powder size distributions for use in the aforementioned method wherein the ceramic slurry is provided in has such a powder size distribution that the filter element in the finished state has a desired porosity distribution across the coil cross-section.

The filter element in the finished state has an increasing or a decreasing porosity distribution across the coil cross-section.

The combustible non-ceramic filter medium is comprised of organic material, for example, cellulose.

Alternatively, the combustible non-ceramic filter medium is comprised of synthetic material.

The method further comprises the step of drying the coil.

The method further comprises the step of sintering the dried coil, wherein the sintering step includes step of burning off the non-ceramic filter medium such that the non-ceramic filter medium is removed by combustion and a rigid ceramic filter element remains in the finished state.

The coil is dried in a microwave device, wherein the parameters of power and residence time are matched to one another, or in a conditioning cabinet, wherein the parameters temperature, humidity and residence time are matched to one another.

The step of sintering is determined by a sintering program determined by a temperature curve over time and the atmosphere in the sintering furnace.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
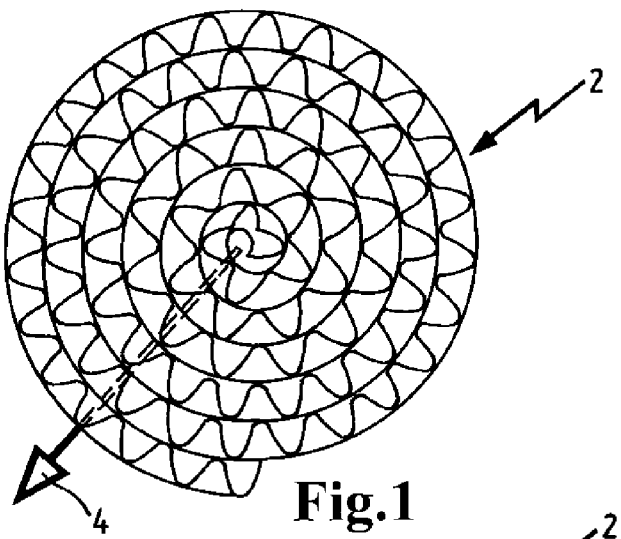
FIG. 1 shows the coil impregnated with a ceramic slurry according to the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

As previously discussed, in the method according to the prior art for producing a ceramic filter element for an exhaust gas filter for an internal combustion engine first a combustible non-ceramic support web is shaped to a coil and is impregnated with a ceramic slurry. Subsequently, the impregnated coil is dried and then sintered. The non-ceramic material can be an organic material, for example, cellulose, or a synthetic material.

Under the conventionally used conditions, a filter element with a uniform weight per surface unit across the entire cross-section is produced and therefore, since the weight per surface unit is directly proportional to porosity, also a uniform pore distribution. The more material (slurry) is present, the higher the weight per surface unit and the more dense the structure after sintering. Thus, the porosity is lowered.

According to the invention, a ceramic slurry may be provided as individual ceramic slurries each having a different powder size distribution to be applied in a selected zoned fashion onto the coil cross section in the unwound state (before rolling) or alternately to the rolled coil such that the resulting powder size distribution that the filter element in the finished state has a desired porosity distribution that varies by zone across the coil cross-section. When for impregnation of the coil a ceramic slurry of a predetermined powder size or powder size distribution is used, a ceramic filter element can be produced that has across its cross-section a varying weight per surface unit and thus varying porosities. In this way a targeted flow guiding action and preferred soot deposition are realizable. The flow always takes the path of least resistance and the flow entrains the soot. In this way, the soot can be deposited in a targeted fashion. It is possible, by means of loading, to produce a pressure loss course that deviates from that of the known technique. It has been found that when drying the impregnated coil by means of appropriately selected parameters a more or less strong migration of the ceramic particles (aluminum titanate) across the cross-section of the component occurs. With a targeted selection of the parameters the filter element can thus be produced such that either internally or externally different weights per surface unit can be generated by means of the employed ceramic suspension. This can still be detected after sintering of the ceramic material.

According to the present invention, the coil is impregnated with a ceramic slurry that has a predetermined powder size or powder size distribution. Such a slurry is produced in that the individual powder, water and binder are ground and the mixture is subsequently stirred. Upon subsequent drying of the impregnated coil the drying method is also a decisive factor for the future properties. For example, the coil can be dried in a microwave device or in a conditioning cabinet. When drying in the conditioning cabinet, the temperature, the humidity and the residence time are important parameters. When drying in a microwave device, the power as well as the residence time play a decisive role.

The sintering program is determined by the temperature curve over time and the atmosphere in the sintering furnace.

FIG. 1 shows a coil 2 that has been impregnated with the ceramic slurry according to the invention. In the direction of the arrow 4 from the interior to the exterior a decreasing porosity is provided and thus an increasing pressure loss Δp.

Figure 2:
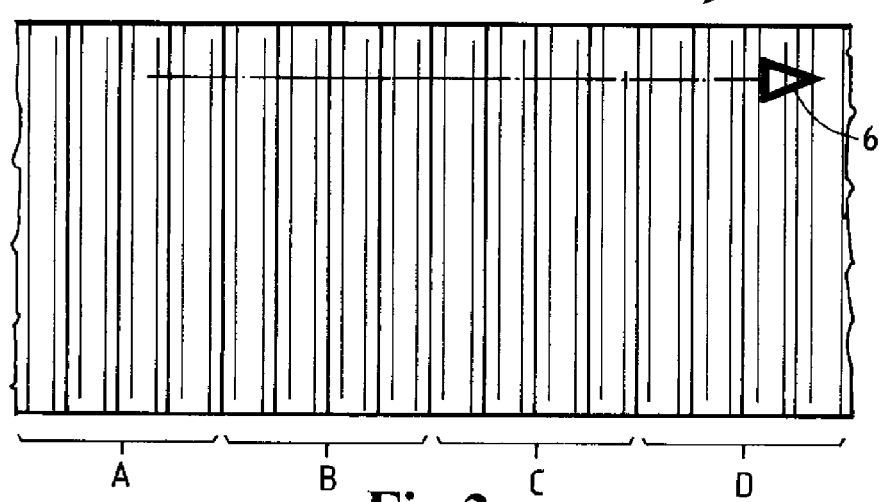
FIG. 2 shows the coil of FIG. 1 in the unwound state.

In FIG. 2 the non-ceramic filter medium of the coil of FIG. 1 is illustrated in the unwound state. It is to be understood that by "unwound state" we mean FIG. 2 may be understood as before winding, in particular we note that "unwound" is identical in meaning to "not wound". There are different zones, in the illustrated case zones A to D, with increasing weight per surface unit from the interior to the exterior in the direction of the arrow 6. As in FIG. 2, the non-ceramic filter medium in an unwound state is dividable into zones along its length in the unwound state such that the zones are arranged sequentially along the length. Each zone may be impregnated with a ceramic slurry having a differing powder size distribution such that the ceramic filter element in the finished state has a desired increasing weight per surface unit from zone to zone along the length thereby providing a porosity distribution that varies across the radial coil cross-section of the wound ceramic filter element from an interior of the coil to an exterior of the coil. In this way the powder size distribution may be varied across zones on the unwound filter medium and similarly radially across the coil cross section of the wound ceramic filter element.

Figure 3:
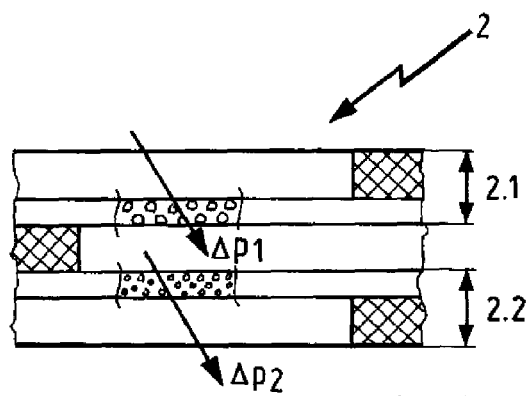
FIG. 3 is a detail view of the cross-section of the coil of FIG. 1.

FIG. 3 finally shows a detail of the cross-section through the coil 2 of FIG. 1 wherein the cross-section through two passages 2.1 and 2.2 with different porosities of the passage walls is shown. In this example, the powder size at 2.1 may be generally of a larger size than the powder size at 2.2. As discussed above and shown in FIG. 2, the differing porosities of the passage walls of passages 2.1 and 2.2 may result in a pressure loss of $\Delta p1$ through the passage wall of passage 2.1 and a different pressure loss $\Delta p2$ through the passage wall of passage 2.2. The porosity decreases downwardly in FIG. 3 due to powder size (2.2 powder size smaller than 2.1 powder size), affording differing porosities and differing ΔP (pressure drop), the decreasing porosity resulting in an increasing pressure drop, $\Delta P2 > \Delta P1$.

It would be apparent to a person skilled in the art that the invention can also be used in order to produce a reverse distribution of the weight per surface unit and thus of the porosity, for example, by particle migration from the exterior to the interior.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for manufacturing a ceramic filter element for an exhaust gas filter of internal combustion engines; the method comprising:

providing a combustible non-ceramic filter medium in an unwound state dividable into zones along its length in the unwound state such that the zones are arranged sequentially along the length;

shaping the combustible, non-ceramic filter medium to a coil; and impregnating the coil with a ceramic slurry having a powder size distribution that is varied across the different zones of said filter medium such that the ceramic filter element in a finished state has an increasing weight per surface unit from zone to zone along the length providing porosity distribution as a volume percent of pores that varies across a radial coil cross-section of the ceramic filter element from an interior of the coil to an exterior of the coil.

2. The method according to claim 1, wherein
the porosity distribution of the ceramic filter element in the finished state decreases across the radial coil cross-section from an interior to an exterior of the ceramic filter element.

3. The method according to claim 1, wherein
the porosity distribution of the ceramic filter element in the finished state increases across the coil cross-section from an interior to an exterior of the ceramic filter element.

4. The method according to claim 1, wherein
the combustible non-ceramic filter medium is comprised of organic material.

5. The method according to claim 4, wherein
the organic material is cellulose.

6. The method according to claim 1, wherein
the combustible non-ceramic filter medium is comprised of synthetic material.

7. The method according to claim 1, further comprising the step of
drying the coil after impregnating.

8. The method according to claim 7, further comprising the step of
sintering the coil after drying;
wherein said sintering step includes step of
burning off said non-ceramic filter medium such that said non-ceramic filter medium is removed by combustion and a rigid ceramic filter element remains.

9. The method according to claim 8, wherein
the step of sintering follows a sintering program determined by a temperature curve over time and an atmosphere in a sintering furnace.

10. The method according to claim 7, wherein
the step of drying is carried out in a microwave device.

11. The method according to claim 7, wherein
the step of drying is carried out in a conditioning cabinet.

* * * * *